United States Patent
Park et al.

(10) Patent No.: US 12,293,337 B2
(45) Date of Patent: May 6, 2025

(54) SERVICE PROVIDING METHOD FOR ALLOCATION OF RETURNING VEHICLE AND SERVICE PROVIDING SYSTEM FOR ALLOCATION OF RETURNING VEHICLE

(71) Applicants: Hyundai Motor Company, Seoul (KR); Kia Corporation, Seoul (KR)

(72) Inventors: Yunjoong Park, Seoul (KR); Jeongtaek Oh, Yongin-si (KR); Byeonghwi Choi, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 335 days.

(21) Appl. No.: 18/065,540

(22) Filed: Dec. 13, 2022

(65) Prior Publication Data

US 2024/0078518 A1   Mar. 7, 2024

(30) Foreign Application Priority Data

Sep. 5, 2022   (KR) .................. 10-2022-0112091

(51) Int. Cl.
| | |
|---|---|
| *G06Q 10/20* | (2023.01) |
| *G06Q 50/40* | (2024.01) |
| *G06Q 50/47* | (2024.01) |
| *H04W 4/029* | (2018.01) |

(52) U.S. Cl.
CPC .............. *G06Q 10/20* (2013.01); *G06Q 50/40* (2024.01); *G06Q 50/47* (2024.01); *H04W 4/029* (2018.02)

(58) Field of Classification Search
CPC ........ G06Q 10/20; G06Q 50/40; G06Q 50/47; G06Q 2240/00; H04W 4/029; H04W 4/02; G01C 21/3453
See application file for complete search history.

(56) References Cited

U.S. PATENT DOCUMENTS

2019/0026671 A1* 1/2019 Al Falasi ........... G01C 21/3438

FOREIGN PATENT DOCUMENTS

| JP | 4307509 B1 | 8/2009 |
|---|---|---|
| KR | 20090093408 A | 9/2009 |
| KR | 20150053295 A | 5/2015 |
| KR | 101587848 B1 | 1/2016 |

* cited by examiner

*Primary Examiner* — Omeed Alizada
(74) *Attorney, Agent, or Firm* — Slater Matsil, LLP (57) ABSTRACT

A method for allocation of a returning vehicle performed by a call service includes allocating a first call to a vehicle operating a taxi business in a first business zone, receiving rate plan information of a second business zone corresponding to a destination of the first call from a taxi terminal corresponding to the vehicle, determining whether the allocation of the returning vehicle is necessary for the vehicle based on the rate plan information, receiving a signal indicating that the vehicle has arrived at the destination of the first call and a signal indicating that the vehicle has left the first business zone from the taxi terminal, and allocating a second call from a departure location in the second business zone to a destination in the first business zone to the vehicle when it is determined that the allocation of the returning vehicle is necessary for the vehicle.

16 Claims, 7 Drawing Sheets

31.2.15 THS 31.2.15.1 True heading and status

| Message | THS |
|---|---|
| Description | True heading and status |
| Firmware | Supported on:<br>• u-blox 8 / u-blox M8 protocol versions 15, 15.01, 16, 17, 18,19, 19.1, 19.2, 20, 20.01, 20.1, 20.2, 20.3, 22, 22.01, 23 and 23.01 (only with ADR products) |
| Type | Output |
| Comment | Actual vehicle heading in degrees produced by any device or system producing true heading. This sentence includes a Mode indicator field providing critical safety-related information about the heading data, and replaces the HDT sentence. |
| Message Info | ID for CFG-MSG: 0xF0 0x0E — Number of fields: 5 |

Message Structure $xxTHS,headt,mi*cs<CR><LF>

Example:

$GPTHS,77.52,E*32

| Field No. | Name | Unit | Format | Example | Description |
|---|---|---|---|---|---|
| 0 | xxTHS | - | string | $GPTHS | THS Message ID (xx = current Talker ID, see NMEA Talker IDs table) |
| 1 | headt | degrees | numeric | 77.52 | Heading of vehicle (true) |

| Field No. | Name | Unit | Format | Example | Description |
|---|---|---|---|---|---|
| 2 | mi | - | character | E | Mode indicator:<br>A = Autonomous<br>E = Estimated (dead reckoning)<br>M = Manual input<br>S = Simulator<br>V = Data not valid |
| 3 | cs | - | hexadecimal | *32 | Checksum |
| 4 | <CR><LF> | - | character | - | Carriage return and line feed |

SERVICE PROVIDING METHOD FOR ALLOCATION OF RETURNING VEHICLE AND SERVICE PROVIDING SYSTEM FOR ALLOCATION OF RETURNING VEHICLE

CROSS-REFERENCE TO RELATED APPLICATIONS

This application claims the benefit of Korean Patent Application No. 10-2022-0112091, filed on Sep. 5, 2022, which application is hereby incorporated herein by reference.

TECHNICAL FIELD

The present disclosure relates to a service providing method for allocation of a returning vehicle and a service providing system for allocation of a returning vehicle.

BACKGROUND

Since a taxi business has a fixed business zone, taxi transportation operators may not transport passengers from other business zones different from the original business zones to which they belong to the other business zones. However, according to the current taxi transportation-related laws and regulations, it is possible to temporarily operate a transportation business in other business zones in which taxi transportation operators return to the original business zones to which the taxi transportation operators belong from the other business zones after driving from the original business zones to the other business zones.

On the other hand, there are many cases where taxis that have moved to other business zones may not pick up passengers on the way back to the original business zones.

The above information disclosed in this background section is only for enhancement of understanding of the background of embodiments of the invention, and therefore it may contain information that does not form the prior art that is already known to a person of ordinary skill in the art.

SUMMARY

Embodiments of the present disclosure provide a service providing method for allocation of a returning vehicle and a service providing system for allocation of a returning vehicle having advantages of increasing the satisfaction with call service use of taxi transportation operators through a call vehicle allocation so that call taxis may operate returning business from other business zones to the original business zone.

An embodiment of the present disclosure provides a method for allocation of a returning vehicle including allocating, by a call server, a first call to a vehicle operating a taxi business in a first business zone, receiving, by the call server, rate plan information of a second business zone corresponding to a destination of the first call from a taxi terminal corresponding to the vehicle, determining, by the call server, whether allocation of the returning vehicle is necessary for the vehicle based on the rate plan information, receiving, by the call server, a signal indicating that the vehicle has arrived at the destination of the first call and a signal indicating that the vehicle has left the first business zone from the taxi terminal, and allocating, by the call server, a second call from a departure in the second business zone to a destination in the first business zone to the vehicle when it is determined that allocation of the returning vehicle is necessary for the vehicle.

The determining of whether allocation of the returning vehicle is necessary for the vehicle based on the rate plan information may include determining that allocation of the returning vehicle is necessary for the vehicle when it is determined that rate plan information of the first business zone and rate plan information of the second business zone are the same.

Another embodiment of the present disclosure provides a method for allocation of a returning vehicle including receiving, by a taxi terminal corresponding to a vehicle operating a taxi business in a first business zone, from a driver of the vehicle, a returning vehicle allocation service request signal for requesting returning business moving from a current location of the vehicle belonging to a second business zone to the first business zone, receiving, by a call server, a returning vehicle allocation service request from the taxi terminal, receiving, by the call server, rate plan information of the second business zone corresponding to the current location of the vehicle from the taxi terminal, receiving, by the call server, a heading value of the vehicle, node information, and link information from the taxi terminal, and allocating, by the call server, a call from the second business zone to a destination belonging to the first business zone to the vehicle.

The allocating of the call from the second business zone to the destination belonging to the first business zone to the vehicle may include determining whether the vehicle is driving based on the heading value of the vehicle, when the vehicle is driving, selecting a first user terminal having the shortest moving distance from the current location of the vehicle from among a plurality of user terminals that have requested a call and that move from a departure belonging to the second business zone to a destination belonging to the first business zone in consideration of a traveling direction of the vehicle, matching the first user terminal to the vehicle, and allocating a call of the first user terminal to the vehicle.

The determining of whether the vehicle is driving may include comparing heading values of the vehicle every period based on a predetermined period and determining that the vehicle is driving when a heading value corresponding to the period changes.

The method may further include when the vehicle is not driving, selecting a second user terminal having the shortest straight distance from the current location of the vehicle among the plurality of user terminals, matching the second user terminal to the vehicle, and allocating a call of the second user terminal to the vehicle.

According to yet another embodiment of the present disclosure, a system for allocation of a returning vehicle including a taxi terminal corresponding to a vehicle operating a taxi business in a first business zone, in which a plurality of applications are installed, and generating a rate plan implemented in a second business zone corresponding to a destination of a first call allocated to the vehicle or rate plan information implemented in a third business zone corresponding to a current location of the vehicle, and a call server allocating a call of one of a plurality of user terminals that have requested a call and that move from a departure belonging to the second business zone or the third business zone to a destination belonging to the first business zone to the vehicle, and transmitting allocation information to the taxi terminal.

The call server may allocate the first call to the vehicle, the plurality of applications may include a call application receiving information indicating the destination of the first call from the call server, a meter application generating rate plan information of the second business zone corresponding to the destination of the first call when receiving destination information of the first call, and a navigation application setting the destination of the first call as a destination of the vehicle when receiving the destination information of the first call, when the vehicle has left the first business zone, generating a signal indicating that the vehicle has left the first business zone, and when the vehicle arrives at the destination of the first call, generating a signal indicating arrival information, and a controller receiving information indicating the destination of the first call from the call server, transmitting the information to the meter application and the navigation application, receiving the rate plan information, the signal indicating that the vehicle has left the first business zone, and the signal indicating the arrival information, and transmitting the rate plan information, the signal indicating that the vehicle has left the first business zone, and the signal indicating the arrival information to the call application.

The call server may receive the rate plan information from the call application, determine whether allocation of the returning vehicle is necessary for the vehicle based on the rate plan information, and when it is determined that allocation of the returning vehicle is necessary for the vehicle, allocate a second call of a destination in the first business zone from a departure in the second business zone.

The call server may determine that allocation of the returning vehicle is necessary for the vehicle when it is determined that rate plan information of the first business zone and rate plan information of the second business zone are the same.

The navigation application may transmit a returning vehicle allocation service request signal to the controller when receiving the returning vehicle allocation service request signal for requesting returning business moving from a current location of the vehicle belonging to the third business zone to the first business zone from a driver of the vehicle through the taxi terminal, and the call application may receive the returning vehicle allocation service request signal from the controller and transmit the returning vehicle allocation service request signal to the call server.

The meter application may receive the returning vehicle allocation service request signal from the controller, generate rate plan information of the third business zone, and transmit the rate plan information to the controller, and the call application may receive the rate plan information of the third business zone from the controller and transmit the rate plan information to the call server.

The navigation application may transmit a heading value of the vehicle, node information, and link information to the controller, and the call application may receive the heading value of the vehicle, the node information, and the link information from the controller and transmit the heading value of the vehicle, the node information, and the link information to the call server.

The call server may determine whether the vehicle is driving based on the heading value of the vehicle, when the vehicle is driving, select a first user terminal having the shortest moving distance from the current location of the vehicle from among a plurality of user terminals that have requested a call and that move from a departure belonging to the second business zone to a destination belonging to the first business zone in consideration of a traveling direction of the vehicle, match the first user terminal to the vehicle, and allocate a call of the first user terminal to the vehicle.

The call server may compare heading values of the vehicle every period based on a predetermined period and determine that the vehicle is driving when a heading value corresponding to the period changes.

The call server may select a second user terminal having the shortest straight distance from the current location of the vehicle among the plurality of user terminals when the vehicle is not driving, match the second user terminal to the vehicle, and allocate a call of the second user terminal to the vehicle.

According to embodiments of the present disclosure, when a taxi transportation operator uses a call, it is possible to improve the satisfaction in the returning business.

According to embodiments of the present disclosure, it is possible to improve the waste of fuel costs of taxis due to the limitation of returning matching.

According to embodiments of the present disclosure, it is possible to improve the efficiency of a taxi business through smooth returning business of the taxi transportation operator.

The following reference identifiers may be used in connection with the accompanying drawings to describe exemplary embodiments of the present disclosure.

1: system for allocation of a returning vehicle
10: call server
20: taxi terminal
210: call application
220: controller
230: meter application
240: navigation application
30: user terminal
31: application

DETAILED DESCRIPTION OF ILLUSTRATIVE EMBODIMENTS

A taxi business in Korea, for example, is operated by being divided into business zones in Seoul metropolitan city, metropolitan city, metropolitan self-governing city, metropolitan self-governing province, or city/Gun units, or Seoul metropolitan city, and metropolitan city/province units by law. In taxis, whether refusal of passengers is legal and whether an inter-city fare is applied, etc. may be determined according to a business zone.

A taxi business may transport passengers within the business zone, and may not transport passengers in other taxi business zones outside the business zone. However, according to the current taxi transportation-related laws and regulations, an inter-city extra charge may not apply since temporary transportation business (returning business) in an outside area on the way back from an outside area to the inside area after operating from the inside area to the outside area is permitted. The inside area refers to a business zone to which a taxi transportation operator belongs, and the outside area refers to an area other than the inside area. Hereinafter, allocation of a vehicle for the returning business is referred to as allocation of a returning vehicle.

In the case where a competent authority integrates and operates two or more business zones of a taxi transportation business, the two or more business zones are joint business zones. Here, the inside area may include not only a taxi transportation operator's own business zone, but also other business zones corresponding to the own business zone and the joint business zones. Business within the joint business zones does not correspond to the returning business. For example, when area X and area Y are the joint business zones, even when a taxi in the area X operates taxi business in the area Y, the taxi business is regarded as business within a business zone, and business from the area Y to the area X does not correspond to the returning business.

Embodiments of the present disclosure may provide a returning vehicle allocation service connecting passengers with an inside area as their destination from an outside area.

Hereinafter, the embodiments disclosed in the present specification will be described in detail with reference to the accompanying drawings, but same or similar components are given the same or similar reference numerals, and redundant descriptions thereof will be omitted. The suffixes "module" and/or "part" for components used in the following description are given or applied in consideration of only the ease of drafting the specification, and do not have meanings or roles distinct from each other by themselves. In addition, in describing the embodiments disclosed in the present specification, when it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, do not limit the technical ideas disclosed in the present specification, and should be understood to include all changes, equivalents or substitutes included in the spirit and scope of the present disclosure.

The terms including an ordinal number, such as first, second, etc., may be used to describe various components, but the components are not limited by the terms. These terms are used only for the purpose of distinguishing one component from another.

It will be further understood that the terms "comprises" and/or "comprising," when used in the present specification, specify the presence of stated features, integers, steps, operations, components, and/or parts, but do not preclude the presence or addition of one or more other features, integers, steps, operations, components, parts, and/or combinations thereof.

A program implemented as a set of instructions embodying a control algorithm necessary to control another configuration may be installed in a configuration controlling another configuration under a specific control condition among configurations according to an embodiment. The control configuration may process input data and stored data according to the installed program to generate output data. The control configuration may include a non-volatile memory to store a program and a memory to store data.

Figure 1:
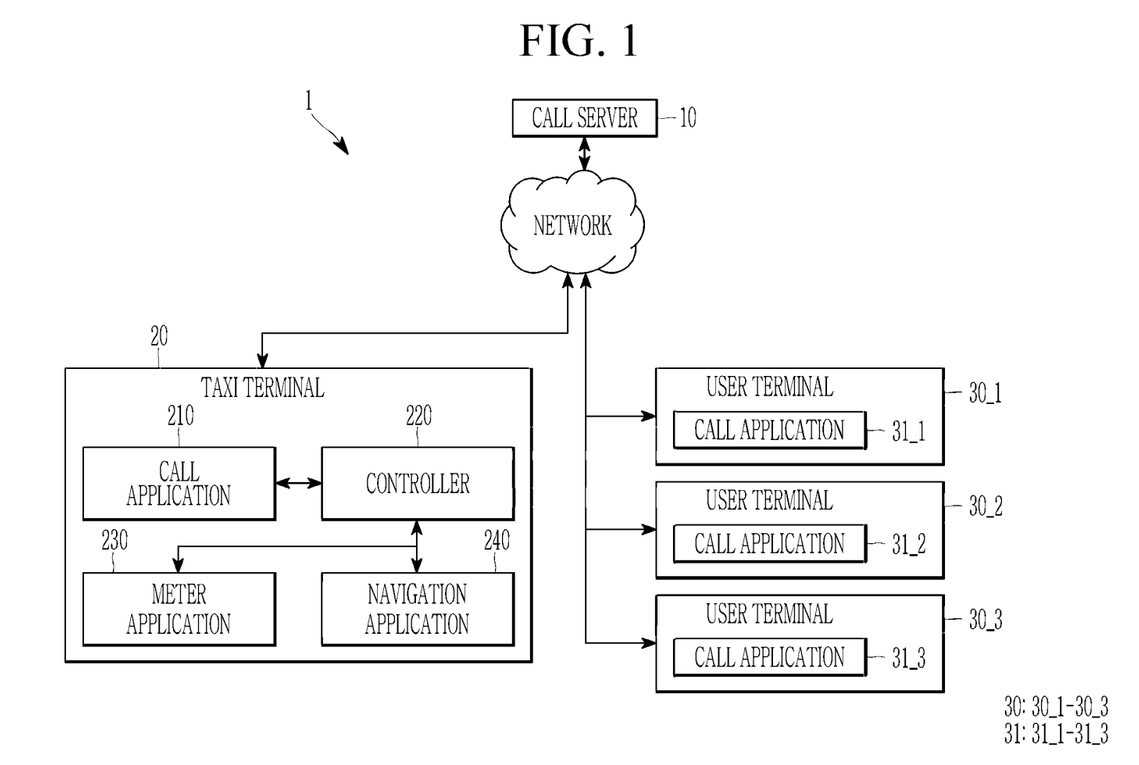
FIG. 1 is a block diagram schematically illustrating a configuration of a service providing system for allocation of a returning vehicle according to an embodiment.

FIG. 1 is a block diagram schematically illustrating a configuration of a service providing system for allocation of a returning vehicle according to an embodiment.

Referring to FIG. 1, the service providing system 1 for allocation of a returning vehicle includes a call server 10, a taxi terminal 20, and a plurality of user terminals 30_1 to 30_3.

The call server 10, the taxi terminal 20, and the plurality of user terminals 30_1 to 30_3 are connected to each other over a network.

The call server 10 may receive a call request from a plurality of user terminals, and, based on a signal received from the taxi terminal 20, matches a user terminal that has requested a call and that moves from a departure area, which is an outside area, to a destination area, which is an inside area, to a vehicle, and allocate the call of the user terminal to the taxi terminal.

At least one of a call application 210, a controller 220, a meter application 230, and a navigation application 240 may be installed in the taxi terminal 20. The controller 220 may transmit/receive a signal to/from each of the call application 210, the meter application 230, and the navigation application 240. The taxi terminal 20 may be a vehicle terminal installed in a vehicle operating as a taxi, or a terminal used by a taxi transportation operator (hereinafter, referred to as a driver) operating a vehicle. In an embodiment, a taxi corresponding to the taxi terminal 20 is called a vehicle.

A plurality of applications including the call application 210, the controller 220, the meter application 230, and the navigation application 240 are installed in the taxi terminal 20 so that the taxi terminal 20 may transmit a signal indicating rate plan information or information according to a location of the vehicle to the call server 10 based on a signal input by a user or a signal received from the call server 10. Hereinafter, the rate plan information may include a method of calculating a fare charged to a taxi passenger according to the taxi business of the vehicle, and may include distance, time, price conditions, etc. with respect to a basic fare, a distance fare, a time charge, an extra charge, etc.

An input unit (not shown) of the taxi terminal 20 may receive a signal from the driver and transmit the input signal to at least one of the call application 210, the controller 220, the meter application 230, and the navigation application 240. An output unit (not shown) of the taxi terminal 20 may provide a screen displayed by each of the call application 210, the controller 220, the meter application 230, and the navigation application 240. The input unit and the output unit of the taxi terminal 20 may be implemented as an all-in-one display included in a display capable of one touch input. The taxi terminal 20 may include an audio video navigation telematics (AVNT) device. The AVNT device may be a device capable of transmitting a signal generated by each of the call application 210, the controller 220, the meter application 230, and the navigation application 240 to the outside over a network. The AVNT device may serve as a communication device of the taxi terminal 20. Hereinafter, the AVNT device transmitting and receiving data to and from the outside will be described as the taxi terminal 20 transmitting and receiving data to and from the outside.

The driver may input a returning vehicle allocation service request signal to the taxi terminal 20 through the input unit. When the taxi terminal 20 receives the returning vehicle allocation service request signal, the taxi terminal 20 may transmit a returning vehicle allocation service request to the call server 10. Alternatively, when a business zone corresponding to the rate plan information transmitted by the taxi terminal 20 to the call server 10 implements a different rate system from the inside area, the call server 10 may allocate a returning vehicle.

An application 31_1 may be installed in the user terminal 30_1, an application 31_2 may be installed in the user terminal 30_2, and an application 31_3 may be installed in the user terminal 30_3.

When common operation and technical characteristics of the plurality of user terminals 30_1 to 30_3 are described, the plurality of user terminals 30_1 to 30_3 are collectively referred to as a user terminal 30. Although the number of user terminals 30 is shown as three, this is for convenience of description, and the number of user terminals 30 is not limited thereto. Hereinafter, it is assumed that the user terminal 30 is a terminal that has transmitted a call request signal to the call server 10, the terminal having requested a call for transportation of a route in which the departure belongs to the outside area and the destination belongs to the inside area.

When the common operation and technical characteristics of the plurality of applications 31_1 to 31_3 are described, the plurality of applications 31_1 to 31_3 are collectively referred to as an application 31.

The driver may indicate a person who operates the vehicle using a call vehicle allocation according to the returning vehicle allocation service according to embodiments of the present disclosure. Hereinafter, persons who use the user terminals 30_1 to 30_3 may be respectively referred to as user 1 to user 3.

The user terminal 30 may transmit a call request signal to the call server 10 by using the application 31. The call request signal transmitted by the user terminal 30 to the call server 10 may include user terminal-related information about the user terminal 30, and the user terminal-related information may include identification information of the user terminal 30, current location information of the user terminal 30, and destination information of the user. The destination information of the user transmitted by the user terminal 30 may be displayed as administrative zone information of at least Seoul metropolitan city, metropolitan city, metropolitan self-governing city, metropolitan self-governing province, city, and Gun units. The call server 10 may extract business zone information corresponding to the destination information based on the administrative zone information.

In an embodiment, in a state in which a destination belonging to the outside area (hereinafter referred to as an outside destination) is set, the call server 10 may allocate a returning vehicle to the taxi terminal 20.

In another embodiment, in a state where the outside destination is not set, the call server 10 may allocate a returning vehicle to the taxi terminal 20.

When generally receiving a call request signal from the user terminal 30, the call server 10 may match one taxi (hereinafter referred to as a matching taxi) to the user terminal 30 based on the current location information of the user terminal 30 and the destination information of the user. The call server 10 may transmit vehicle-related information of the matching taxi to the user terminal 30. The application 31 may provide a screen indicating vehicle-related information of the matching taxi to the user through the user terminal 30. The user may select whether to use the matching taxi through the user terminal 30. When the user terminal 30 transmits a selected result to the call server 10 and is connected to the matching taxi, the call server 10 may allocate the matching taxi to the user terminal 30. When the call server 10 allocates a call to the vehicle, information related to the vehicle to which the call is allocated may be transmitted to the user terminal 30. The vehicle-related information may include identification information of the taxi vehicle and identification information of the taxi terminal 20. The identification information of the taxi vehicle may include a vehicle number of the taxi, a vehicle type of the taxi vehicle, etc. The identification information of the taxi terminal 20 may include a phone number of the taxi terminal 20, driver-related information about a taxi driver, etc.

When the outside destination is set in the taxi terminal 20, the call server 10 may receive rate plan information according to the outside destination from the taxi terminal 20. When the vehicle arrives at the outside destination, the call server 10 may receive from the taxi terminal 20 a signal indicating that the vehicle has arrived at the outside destination and a signal indicating that the vehicle has left the inside area. When receiving the signal indicating that the vehicle has arrived at the outside destination from the taxi terminal 20, the call server 10 may allocate the returning vehicle to the taxi terminal 20. The call server 10 may distinguish terminals that have requested the call and that move from the departure belonging to the business zone to which the outside destination belongs to the destination belonging to the inside area among the call request signals, and may allocate the returning vehicle to a call request of one terminal among terminals that have requested the call and that move from the departure within the business zone to which the outside destination belongs to the destination within the inside area.

Alternatively, when the outside destination is not set in the taxi terminal 20 and the returning vehicle allocation service request is received from the driver, the call server 10 may receive rate plan information according to the current location of the vehicle from the taxi terminal 20. When receiving heading value information and node/link information of the vehicle from the taxi terminal 20, the call server 10 may allocate the returning vehicle to the taxi terminal 20 based on the received heading value information and node/link information. The call server 10 may distinguish terminals that have requested the call and that move from a departure belonging to a business zone to which the current location of the vehicle belongs to the destination belonging to the inside area among call request signals, and may allocate the returning vehicle to a call request of one terminal among terminals that have requested the call and that move from the departure within the business zone to which the current location of the vehicle belongs to the destination within the inside area.

The call application 210 may transmit the signal received from the controller 220 to the call server 10 through the taxi terminal 20. When the returning vehicle is allocated, the taxi terminal 20 may receive information about a terminal to which the returning vehicle is allocated and matching the vehicle among the plurality of user terminals 30_1 to 30_3 from the call server 10. When receiving the information about the terminal matching the vehicle, the taxi terminal 20 may provide a screen displaying the information about the terminal matching the vehicle through the call application 210.

The controller 220 may transmit the destination of the call received from the call application 210 to the meter application 230 and receive the rate plan information according to the destination of the call from the meter application 230.

The controller 220 may transmit the destination of the call received from the call application 210 to the navigation application 240.

In addition, the controller 220 may transmit the returning vehicle allocation service request signal received from the navigation application 240 to the meter application 230 and receive the rate plan information according to the current location of the vehicle from the meter application 230. Here, the current location indicates a location of the vehicle at any time in a period from a time when the meter application 230 receives the returning vehicle allocation service request from the controller 220 to a time when the meter application 230 transmits the rate plan information to the controller 220.

The controller 220 may receive the rate plan information from the meter application 230 and may receive arrival information and the signal indicating that the vehicle has left the inside area from the navigation application 240. The controller 220 may transmit a signal required for the call request to the call application 210 based on the signal received from each of the meter application 230 and the navigation application 240. Information required for the call request may include the rate plan information based on the current location of the vehicle, the arrival information based on GPS information of the vehicle, etc.

The meter application 230 may calculate the location of the vehicle, a moving distance, a moving time, etc. based on the GPS information of the vehicle, and accordingly calculate a driving fee of the taxi. The meter application 230 may transmit a rate plan information inquiry signal of a specific point to a control center (not shown) that manages the rate policy of a local government. The meter application 230 may be implemented as an app meter (application-type meter). The meter application 230 may receive rate plan information implemented in a business zone to which the specific point belongs in response to the rate plan information inquiry from the control center. The meter application 230 may transmit a rate plan information inquiry signal to the control server in response to a rate plan information request of the controller 220. The meter application 230 may receive rate plan information corresponding to a business zone to which the current location or destination of the call belongs based on the current location of the vehicle or the destination of the call in response to the rate plan information inquiry from the control server. The meter application 230 may transmit the rate plan information received from the control server to the controller 220.

When receiving the destination information of the call from the controller 220, the navigation application 240 may search for a route from the current location of the vehicle or the departure of the call to the destination of the call. The navigation application 240 may provide a screen displaying the found route through the taxi terminal 20. Hereinafter, it will be described that the navigation application 240 provides the screen displaying the found route through the taxi terminal 20 as a destination setting in the navigation application 240.

Here, the current location indicates a location of the vehicle at any time in a period from a time when the navigation application 240 receives the destination information of the call from the controller 220 to a time when the destination is set in the navigation application 240.

When the vehicle leaves the inside area, the navigation application 240 may transmit the signal indicating that the vehicle has left the inside area to the controller 220 based on the GPS information of the vehicle. When the vehicle arrives at the destination set in the navigation application 240, the navigation application 240 may transmit the signal indicating that the vehicle has arrived at the destination to the controller 220 based on the GPS information of the vehicle.

The navigation application 240 may provide the taxi terminal 20 with a screen where the returning vehicle allocation service request can be input. The driver may input the returning vehicle allocation service request signal to the taxi terminal 20. When the driver inputs the returning vehicle allocation service request signal through the taxi terminal 20, the navigation application 240 may transmit a signal indicating the returning vehicle allocation service request to the controller 220, and the controller 220 may transmit the returning vehicle allocation service request to the call application 210. The call application 210 that has received the returning vehicle allocation service request may transmit the returning vehicle allocation service request to the call server 10 through the taxi terminal 20.

The heading value information and node link of the vehicle may be transmitted to the controller 220. A destination may be set in the navigation application 240. Here, the destination may be a destination of the call allocated to the taxi terminal 20.

A GPS module (not shown) may not be mounted on the taxi terminal 20. The GPS module may calculate a heading value of the vehicle. The heading value of the vehicle may indicate a traveling direction when the vehicle is traveling. The GPS module may calculate the heading value by a GPS-DR fusion algorithm of the vehicle. The GPS-DR fusion algorithm is one method of calculating the heading value by using a GPS receiver and a dead reckoning (DR) system. The DR system estimates a distance traveled by a WT count and a forward/reverse (F/R) indicator. The DR system estimates a change in the direction through measurement of a yaw rate sensor (e.g., a gyroscope). The gyroscope measures a rotation speed of the vehicle with respect to a z-axis of the vehicle. When a yaw rate is determined by the gyroscope, less noise may be generated than deriving the yaw rate by distinguishing left and right wheel ticks.

The GPS module may collect node information such as intersections of roads, start/end points of roads and bridges, IC/JCs, etc. and link information such as roads, bridges, underpasses, and tunnels from a standard node link which is an Intelligent Transport Systems (ITS) standard transport network database (DB).

The navigation application 240 may receive the heading value and the node/link information of the vehicle from the GPS module. The navigation application 240 may transmit the heading value and the node/link information of the vehicle to the controller 220.

Figure 2:
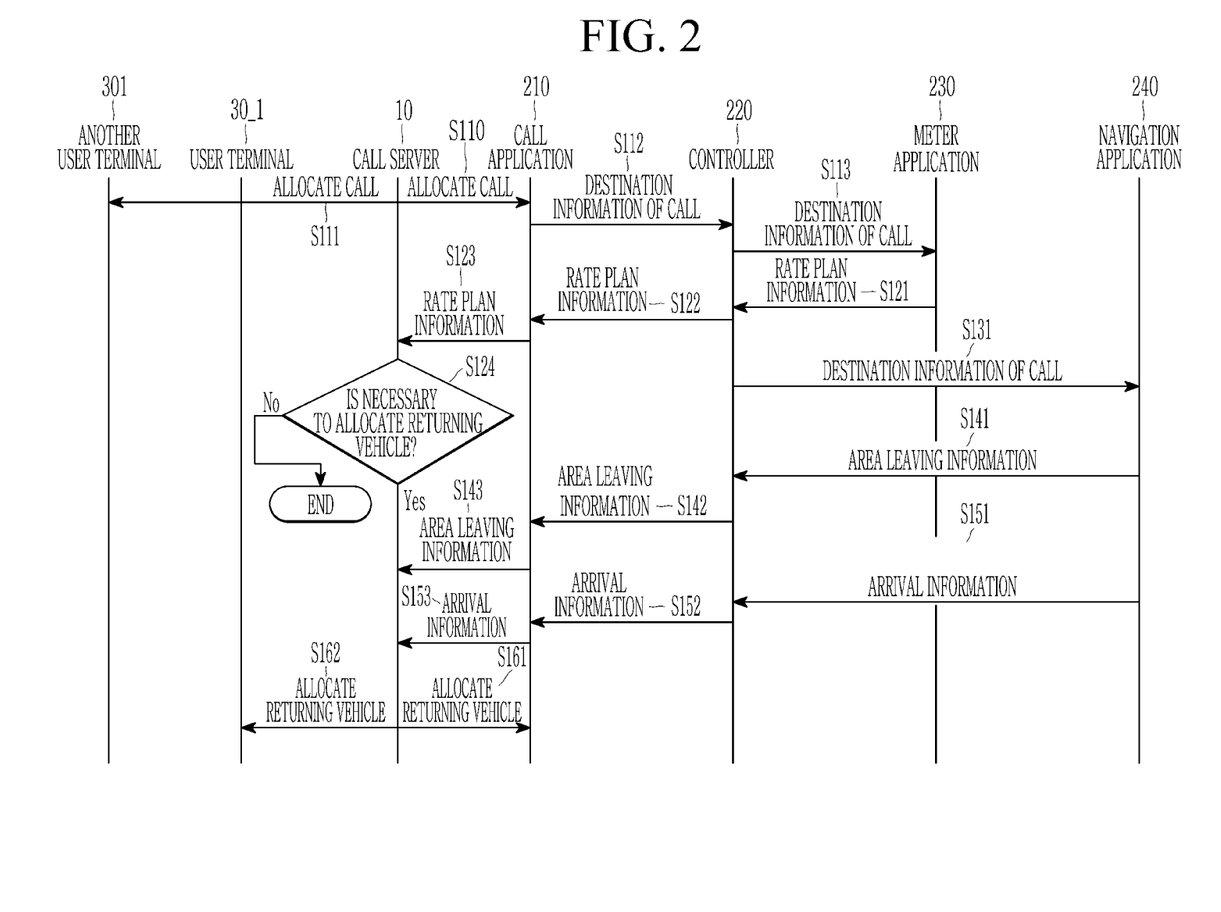
FIG. 2 is a flowchart of a service providing method for allocation of a returning vehicle according to an embodiment.

FIG. 2 is a flowchart of a service providing method for allocation of returning vehicle according to an embodiment.

The call server 10 may allocate a call to a vehicle (S110). Hereinafter, the call allocated in step S110 is referred to as a precedence call so as to be distinguished from a call allocated to a returning vehicle.

The call server 10 may transmit a signal indicating that the precedence call has been allocated to the vehicle to another user terminal 301 that has requested the preceding call (S111). It is assumed that the other user terminal 301 is a terminal that has transmitted a call request signal to the call server 10. A departure of the call requested by the other user terminal 301 may be an inside area, but is not limited thereto.

The call application 210 may transmit a signal indicating destination information of the precedence call to the controller 220 (S112). The controller 220 may transmit the destination information of the precedence call to the meter application 230 (S113).

When receiving the destination information of the precedence call, the meter application 230 may generate rate plan information implemented in a business zone corresponding to the destination of the precedence call among a plurality of business zones. For example, the meter application 230 may generate the rate plan information implemented in the business zone corresponding to the destination of the precedence call based on data received from the control server. The meter application 230 may transmit the rate plan information implemented in the business zone corresponding to the destination of the precedence call among the plurality of business zones to the controller 220 (S121). Here, the rate plan information is rate plan information of the destination of the precedence call, and the rate plan information may further include rate plan information of the inside area.

The controller 220 may transmit the rate plan information to the call application 210 (S122).

The call application 210 may transmit the rate plan information to the call server 10 through the taxi terminal 20 (S123).

When receiving the rate plan information, the call server 10 may compare the rate plan information of the destination of the precedence call with rate plan information of the inside area to determine whether it is necessary to allocate the returning vehicle (S124). A taxi business fare system may be operated differently for each business zone of the taxi. Therefore, for example, when rate plan information of area A and rate plan information of area B are different from each other, the call server 10 may determine that the area A and the area B belong to different business zones. The call server 10 may determine whether the business zone corresponding to the destination of the precedence call is the same as a business zone that is the inside area.

When it is determined that the destination of the precedence call and the inside area belong to the same business zone, the call server 10 may determine that it is unnecessary to allocate the returning vehicle. When it is determined that the destination of the precedence call and the inside area do not belong to the same business zone, the call server 10 may determine that it is necessary to allocate the returning vehicle.

When it is determined in step S124 that it is unnecessary to allocate the returning vehicle, the call server 10 may end the returning vehicle allocation service. Hereinafter, it will be described that the call server 10 determines that it is necessary to allocate the returning vehicle.

The controller 220 may also transmit the destination information of the precedence call to the navigation application 240 (S131).

When receiving the destination information of the precedence call, the navigation application 240 may set the destination of the precedence call as the destination of the vehicle. The navigation application 240 may search for a route from the current location of the vehicle or the departure of the precedence call to the destination of the precedence call. The navigation application 240 may provide a screen indicating the route to the destination of the precedence call through the taxi terminal 20.

When the location of the vehicle leaves the inside area, the navigation application 240 may generate a signal indicating inside area leaving information. The navigation application 240 may transmit the signal indicating the inside area leaving information to the controller 220 (S141). The inside area leaving information is information indicating that the vehicle has left the inside area and may include information indicating that the vehicle is currently located in an outside area.

When the vehicle arrives at the destination of the precedence call, the navigation application 240 may generate a signal indicating arrival information. The navigation application 240 may transmit the signal indicating the arrival information to the controller 220 (S151). The arrival information is information indicating that the vehicle has arrived at the destination of the precedence call and may include a time when the vehicle arrived at the destination of the precedence call.

In FIG. 2, it is shown that step S151 is performed after step S141, but the disclosure is not limited thereto, and the navigation application may perform step S141 after step S151 or perform the respective steps simultaneously according to the location of the vehicle.

The controller 220 may transmit the inside area leaving information to the call application 210 (S142). The call application 210 may transmit the inside area leaving information to the call server 10 through the taxi terminal 20 (S143).

The controller 220 may transmit the arrival information to the call application 210 (S152). The call application 210 may transmit the arrival information to the call server 10 through the taxi terminal 20 (S153).

When it is determined in step S124 that it is necessary to allocate the returning vehicle, and the inside area leaving information and the arrival information are received from the call application 210, the call server 10 may allocate the returning vehicle. The call server 10 may transmit information about a terminal to which the returning vehicle is allocated and matching the vehicle among the plurality of user terminals 30_1 to 30_3 to the taxi terminal 20 (S161).

The call server 10 may derive a terminal (hereinafter, a first candidate terminal) that has requested a call service and that moves from a departure within a business zone to which an outside destination of another terminal belongs to the destination within the inside area corresponding to the business zone of the vehicle among the call request signals. The departure of the first candidate terminal may belong to an area within a predetermined call allowable distance from the outside destination, and the destination of the first candidate terminal may belong to the inside area. Here, the predetermined call allowable distance may be increased or decreased according to the number of first candidate terminals. For example, when the number of first candidate terminals divided with respect to a predetermined first call allowable distance is equal to or greater than a predetermined number, the first candidate terminals may be derived with respect to a predetermined second call allowable distance narrower than the predetermined first call allowable distance.

The call server 10 may determine one of the derived first candidate terminals as a matching terminal. The call server 10 may match the vehicle to the matching terminal and allocate the returning vehicle. The call server 10 may transmit vehicle-related information of the taxi terminal 20 to the matching terminal. An application of the matching terminal may provide a screen displaying the vehicle-related information of the taxi terminal 20 to a user of the matching terminal through the matching terminal. When the user selects whether to use the vehicle through the matching terminal, the matching terminal may transmit a selected result to the call server 10. Alternatively, the matching terminal may transmit the selected result to the taxi terminal 20, and the taxi terminal 20 may transmit a result selected by the user to the call server 10. When a vehicle corresponding to the taxi terminal 20 is selected through the matching terminal, the call server 10 may match the vehicle to the matching terminal and allocate the returning vehicle, and inform the taxi terminal 20 and the matching terminal that the returning vehicle is allocated. Hereinafter, the matching terminal in step S161 is the user terminal 30_1.

The call server 10 may transmit a signal indicating that the returning vehicle is allocated to the user terminal 30_1 that has requested the returning vehicle allocation call (S162).

In the embodiment of FIG. 2, the destination is set in the navigation application 240 before the call server 10 allocates the returning vehicle.

Hereinafter, unlike FIG. 2, an embodiment in which the destination is not set in the navigation application 240 before the call server 10 allocates the returning vehicle will be described with reference to FIG. 3.

Figure 3:
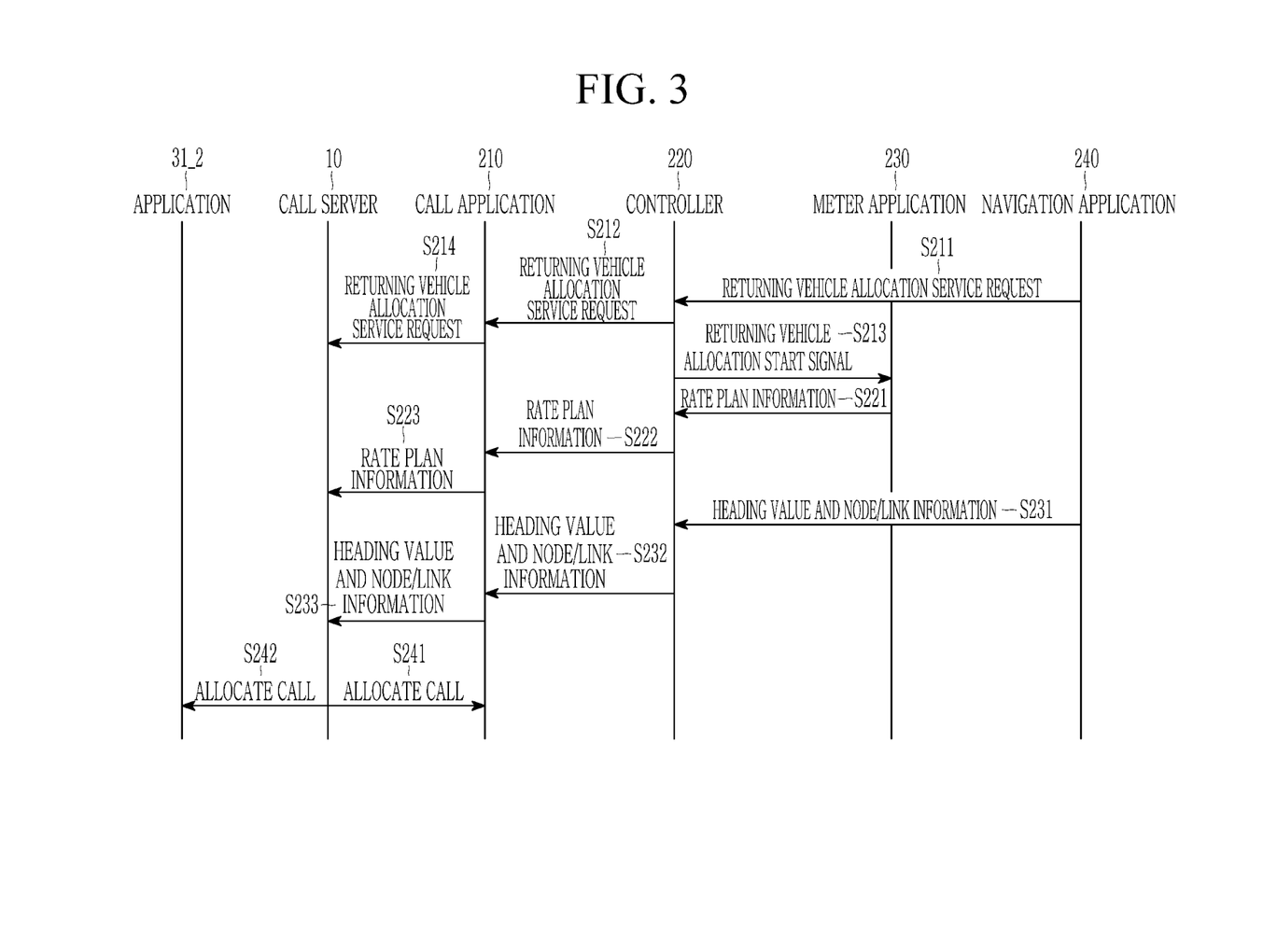
FIG. 3 is a flowchart of a service providing method for allocation of a returning vehicle according to an embodiment.

FIG. 3 is a flowchart of a service providing method for allocation of a returning vehicle according to an embodiment.

The navigation application 240 may transmit, to the controller 220, a returning vehicle allocation service request signal for requesting a returning vehicle allocation that moves from a departure within a business zone to which the current location of a vehicle belongs to a destination within an inside area (S211). The navigation application 240 may provide the taxi terminal 20 with a screen where the returning vehicle allocation service request can be input. The driver may input the returning vehicle allocation service request signal to the taxi terminal 20. When the taxi terminal 20 receives the returning vehicle allocation service request, the navigation application 240 may transmit a signal indicating the returning vehicle allocation service request to the controller 220. Here, it will be described that the current location of the vehicle is an outside area. However, this is for convenience of description, and the disclosure is not limited thereto. Even though the current location of the vehicle is an inside area, when the driver inputs a point (e.g., point A) belonging to the outside area to the navigation application as the departure through the taxi terminal 20, in steps to be described later, the call server 10, the call application 210, the controller 220, the meter application 230, and the navigation application 240 may each operate with respect to the point A instead of the current location of the vehicle.

Alternatively, the driver may input the returning vehicle allocation service request signal by using a function of a vehicle other than the taxi terminal 20. Here, the function of the vehicle may be a function implemented so that the driver of the vehicle may transmit a predetermined signal to the taxi terminal 20 through a physical button or a touch screen in the vehicle. For example, the function of the vehicle is a physical button located on a steering wheel of the vehicle, and the driver may input the returning vehicle allocation service request signal by pressing the physical button. In this case, a configuration (not shown) controlling the function of the vehicle may transmit a signal indicating the returning vehicle allocation service request to the controller 220. Hereinafter, for convenience of explanation, it is assumed that the driver inputs the returning vehicle allocation service request signal to the taxi terminal 20.

The controller 220 may transmit the returning vehicle allocation service request to the call application 210 (S212). The controller 220 may transmit the returning vehicle allocation service request to the meter application 230 (S213).

The call application 210 may transmit the returning vehicle allocation service request to the call server 10 through the taxi terminal 20 (S214).

When receiving the returning vehicle allocation service request, the meter application 230 may generate rate plan information implemented in a business zone corresponding to the current location of the vehicle among a plurality of business zones. The meter application 230 may transmit, to the controller 220, the rate plan information implemented in the business zone corresponding to the current location of the vehicle among the plurality of business zones (S221). The controller 220 may transmit the rate plan information to the call application 210 (S222).

The call application 210 may transmit the rate plan information to the call server 10 through the taxi terminal 20 (S223).

When transmitting the signal indicating the returning vehicle allocation service request, the navigation application 240 may transmit the heading value of the vehicle and node/link information to the controller 220 (S231).

The navigation application 240 may receive the heading value of the vehicle and node/link information from the GPS module. The navigation application 240 may transmit the heading value and the extracted node/link information to the controller 220.

The controller 220 may transmit the heading value and the node/link information to the call application 210 (S232).

The call application 210 may transmit the heading value and the node/link information to the call server 10 through the taxi terminal 20 (S233).

When receiving the heading value and the node/link information from the call application 210, the call server 10 may allocate the returning vehicle. The call server 10 may transmit user terminal-related information corresponding to a terminal to which the returning vehicle is allocated and matching the vehicle among the plurality of user terminals 30_1 to 30_3 to the taxi terminal 20 (S241).

Hereinafter, a step in which the call server 10 of FIG. 3 allocates the returning vehicle will be described in detail with reference to FIGS. 4 to 6.

Figure 4:
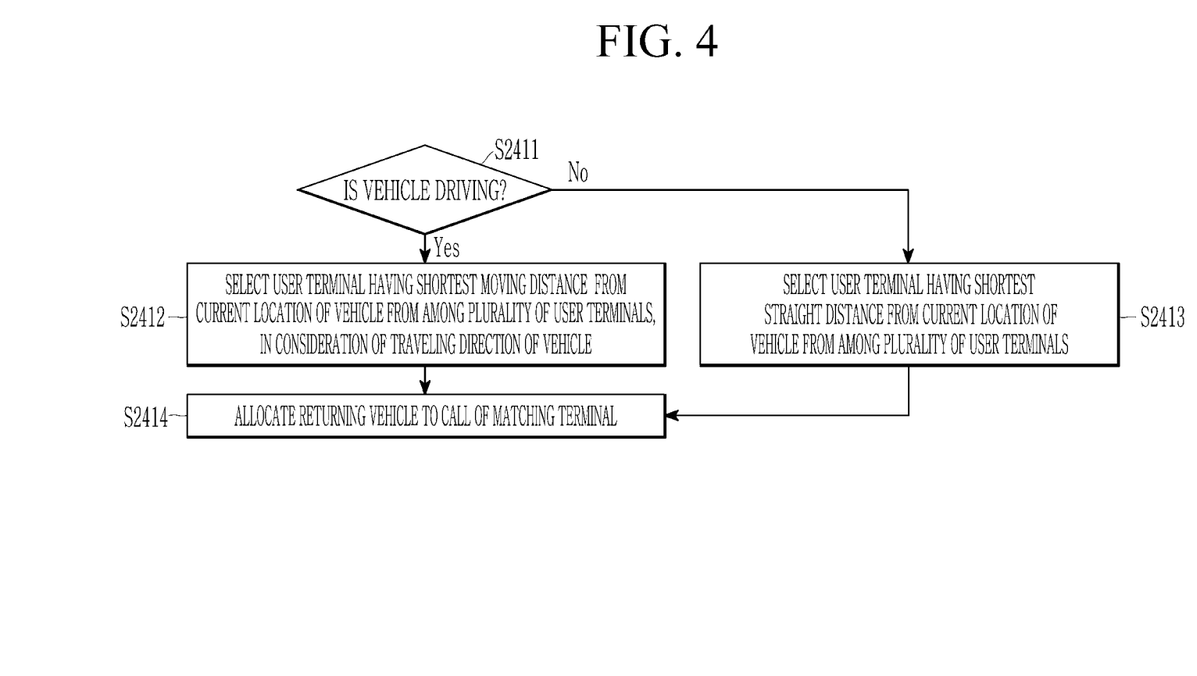
FIG. 4 is a detailed flowchart of step S241 of FIG. 3.

FIG. 4 is a detailed flowchart of step S241 of FIG. 3.

The call server 10 may determine whether a vehicle is driving based on a heading value of the vehicle (S2411).

With respect to a predetermined monitoring period, the call server 10 may compare heading values every corresponding period and determine that the vehicle is driving when the heading value corresponding to the period changes. For example, when a first period and a second period corresponding to a predetermined unit period sequentially proceed, the call server 10 may compare a first heading value in the first period with a second heading value in a second period, and when the first heading value and the second heading value are the same, may determine that the vehicle is not driving. The vehicle that the call server 10 determines it is not driving may be stopping.

Figure 5:
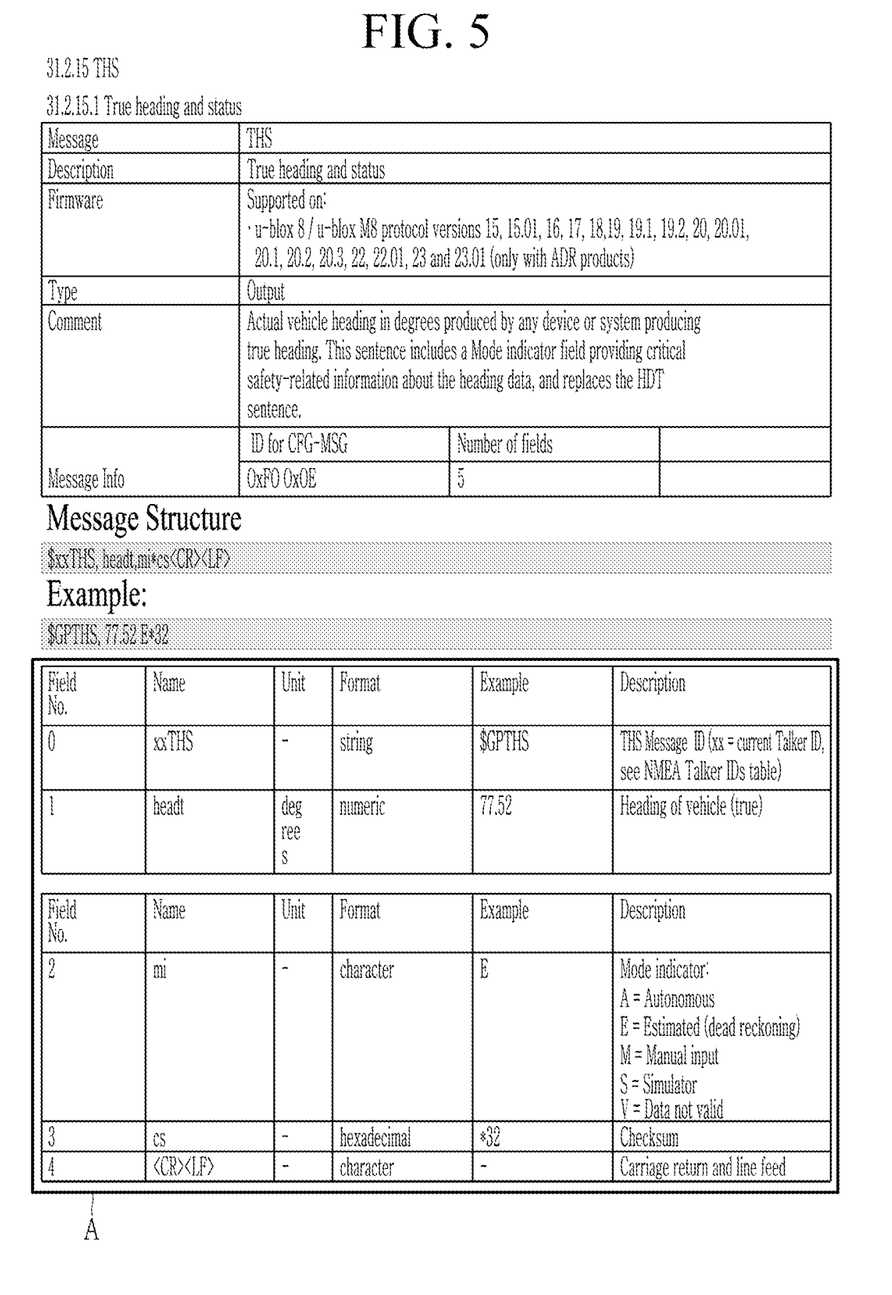
FIG. 5 is an exemplary diagram explaining a heading value generated by a GPS module.

FIG. 5 is an exemplary diagram explaining a heading value generated by a GPS module.

Referring to FIG. 5, in a table indicated by "A", "Heading of vehicle" is described in a "Description" column of a row in which "Field No." is described as "1", which indicates that the corresponding row indicates a heading value of a vehicle, and "77.52" is described in an "Example" column, which indicates that the corresponding column indicates the corresponding value of the vehicle. The heading value of the vehicle may be described as a heading angle with respect to the front of the vehicle.

When determining that the vehicle is driving, the call server 10 may identify a traveling direction of the vehicle. For example, the call server 10 may identify a road on which the vehicle is located and a direction in which the vehicle travels on the corresponding road from link information.

If it is determined that the vehicle is driving, the call server 10 may select the user terminal 30_1 having the shortest moving distance from the current location of the vehicle from among the plurality of user terminals 30_1 to 30_3 that have requested a call and that move from a departure belonging to an outside area to a destination belonging to an inside area, in consideration of the traveling direction of the vehicle (S2412).

The call server 10 may distinguish a terminal (hereinafter, a second candidate terminal) that has requested a call and that moves from a departure belonging to a business zone to which the current location of the vehicle belongs to the destination belonging to the inside area among call request signals. The departure of a call route requested by the second candidate terminal may belong to an area within a range of a predetermined distance from the current location of the vehicle, and the destination of the call route requested by the second candidate terminal may belong to the inside area. Here, the predetermined distance may be increased or decreased according to the number of second candidate terminals. Hereinafter, the second candidate terminals are referred to as the plurality of user terminals 30_1 to 30_3.

Hereinafter, an operation in which the call server 10 selects the user terminal 30_1 when the vehicle is driving will be described with reference to FIG. 6.

Figure 6:
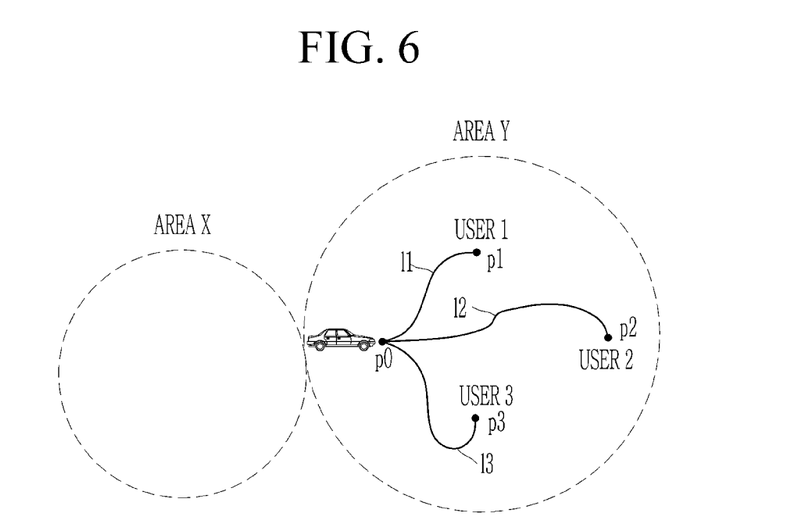
FIG. 6 is an exemplary diagram illustrating movement distances from a current location to a plurality of user terminals based on a traveling direction of a vehicle.

FIG. 6 is an exemplary diagram illustrating movement distances from a current location to a plurality of user terminals based on a traveling direction of a vehicle.

In FIG. 6, an inside area is indicated as an "AREA X" and an outside area is indicated as an "AREA Y". The current location of the vehicle is shown as "p0", a departure of a call request of the user terminal 30_1 is shown as "p1", a departure of a call request of the user terminal 30_2 is shown as "p2", and a departure of a call request of the user terminal 30_3 is shown as "p3".

The call server 10 may find a route from the current location P0 of the vehicle to the departure of the call request of each of the plurality of user terminals 30_1 to 30_3 based on a traveling direction of the vehicle and received node/link information. A method in which the call server finds a route may be a method in consideration of the shortest distance, the minimum time, etc.

The call server 10 may generate a route l1 from the current location p0 of the vehicle to the location p1. The call server 10 may generate a route l2 from the current location p0 of the vehicle to the location p2. The call server 10 may generate a route l3 from the current location p0 of the vehicle to the location p3.

The call server 10 may determine the user terminal 30_1 corresponding to the shortest route l1 among the plurality of routes l1 to l3 as a matching terminal.

Referring to FIG. 4, when it is determined that the vehicle is not driving, the call server 10 may select user terminal 30_3 having the shortest straight distance from the current location of the vehicle from among the plurality of user terminals 30_1 to 30_3 that have requested a call service and that move from a departure belonging to an outside area to a destination belonging to an inside area (S2413).

Hereinafter, an operation in which the call server 10 selects the user terminal 30_3 when the vehicle is not driving will be described with reference to FIG. 7.

Figure 7:
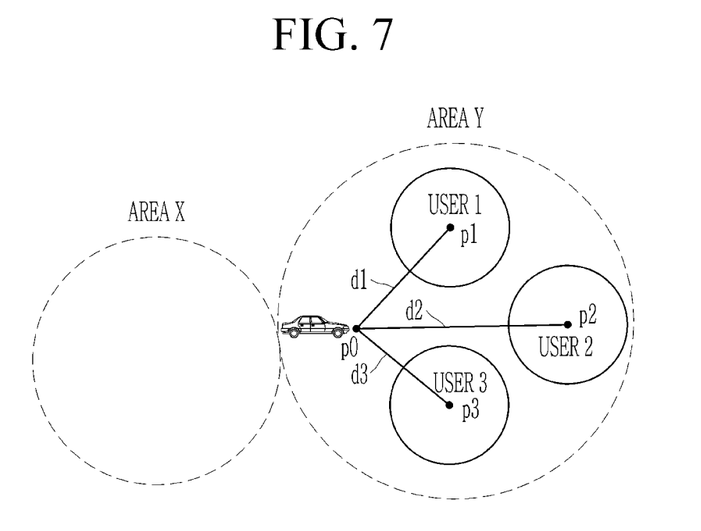
FIG. 7 is an exemplary diagram illustrating straight distances from a current location of a vehicle to a plurality of user terminals.

FIG. 7 is an exemplary diagram illustrating straight distances from a current location of a vehicle to a plurality of user terminals.

In FIG. 7, an inside area is indicated as an "AREA X" and an outside area is indicated as an "AREA Y". The current location of the vehicle is shown as "p0", a departure of a call request of the user terminal 30_1 is shown as "p1", a departure of a call request of the user terminal 30_2 is shown as "pa", and a departure of a call request of the user terminal 30_3 is shown as "p3".

The call server 10 may calculate a straight distance from the current location P0 of the vehicle to the departure of the call request of each of the plurality of user terminals 30_1 to 30_3. The call server 10 may generate a straight distance d1 from the current location p0 of the vehicle to the location p1. The call server 10 may generate a straight distance d2 from the current location p0 of the vehicle to the location pa. The call server 10 may generate a straight distance d3 from the current location p0 of the vehicle to the location p3.

The call server 10 may determine the user terminal 30_3 corresponding to the shortest route d3 among the plurality of routes d1 to d3 as a matching terminal.

Subsequent to step S2412, or subsequent to step S2413, the call server 10 may allocate a returning vehicle to a call of the matching terminal (S2414).

The call server 10 may match the vehicle to the matching terminal and allocate the returning vehicle. The call server 10 may transmit vehicle-related information of the taxi terminal 20 to the matching terminal (S242).

An application of the matching terminal may provide a screen displaying the vehicle-related information to a user of the matching terminal through the matching terminal. When the user of the matching terminal selects whether to use the vehicle through the matching terminal, the matching terminal may transmit a selected result to the call server 10. In step S2412, since the user terminal 30_1 is the matching terminal, user 1 may select whether to use the vehicle through the user terminal 30_1, and in step S2413, since the user terminal 30_3 is the matching terminal, user 3 may select whether to use the vehicle through the user terminal 30_3.

Alternatively, the matching terminal may transmit a selected result to the taxi terminal 20, and the taxi terminal 20 may transmit the result selected by the user to the call server 10. When the matching terminal selects to use the vehicle, the call server 10 may match the vehicle to the matching terminal and allocate the returning vehicle, and may notify the taxi terminal 20 and the matching terminal that the returning vehicle has been allocated.

According to an embodiment, when the vehicle needs an operation from an outside area to an inside area, the call server 10 may match a passenger moving on a route suitable for the corresponding operation to the taxi terminal 20 and allocate the returning vehicle.

In an embodiment, the business zone has been described as a zone defined in the relevant regulations for a taxi business, but the disclosure is not limited thereto, and the business zone may be a zone determined in advance by the call server 10 and the controller 220 for returning matching.

Although the embodiments of the present disclosure have been described in detail above, the scope of the present disclosure is not limited thereto, and various modifications and improvement forms of those skilled in the art are also within the scope of the present disclosure.

What is claimed is:

1. A method for allocation of a returning vehicle, the method comprising:
    allocating, by a call server, a first call to a vehicle operating a taxi business in a first business zone;
    receiving, by the call server, rate plan information of a second business zone corresponding to a destination of the first call from a taxi terminal corresponding to the vehicle;

determining, by the call server, that the allocation of the returning vehicle is necessary for the vehicle based on the rate plan information when the rate plan information of the first business zone and the rate plan information of the second business zone are different;

receiving, by the call server, a signal indicating that the vehicle has arrived at the destination of the first call and a signal indicating that the vehicle has left the first business zone from the taxi terminal; and allocating, by the call server, a second call from a departure location in the second business zone to a destination in the first business zone to the vehicle when it is determined that the allocation of the returning vehicle is necessary for the vehicle.

2. A method for allocation of a returning vehicle, the method comprising:

receiving, by a call server, a returning vehicle allocation service request for requesting returning business moving from a current location of a vehicle in a second business zone to a first business zone, from a taxi terminal corresponding to the vehicle operating a taxi business in the first business zone;

receiving, by the call server, rate plan information of the second business zone corresponding to the current location of the vehicle from the taxi terminal;

receiving, by the call server, a heading value of the vehicle, node information, and link information from the taxi terminal; and allocating, by the call server, a call from the second business zone to a destination in the first business zone to the vehicle, wherein allocating the call from the second business zone to the destination in the first business zone to the vehicle comprises:

determining whether the vehicle is driving based on the heading value of the vehicle;

when the vehicle is determined to be driving, selecting a first user terminal having a shortest moving distance from the current location of the vehicle from among a plurality of user terminals that have requested a call to move from a departure location in the second business zone to the destination in the first business zone based on a traveling direction of the vehicle;

matching the first user terminal to the vehicle; and allocating the call of the first user terminal to the vehicle.

3. The method of claim 2, wherein determining whether the vehicle is driving comprises:

comparing heading values of the vehicle every period based on a predetermined period; and determining that the vehicle is driving when the heading value corresponding to the period changes.

4. The method of claim 2, further comprising:

when the vehicle is determined not to be driving, selecting a second user terminal having a shortest straight distance from the current location of the vehicle among the plurality of user terminals;

matching the second user terminal to the vehicle; and allocating the call of the second user terminal to the vehicle.

5. A system for allocation of a returning vehicle, the system comprising:

a taxi terminal corresponding to a vehicle registered to operate a taxi business in a first business zone, wherein a plurality of applications are installed in the taxi terminal, and wherein the taxi terminal is configured to generate a rate plan implemented in a second business zone corresponding to a destination of a first call allocated to the vehicle or rate plan information implemented in a third business zone corresponding to a current location of the vehicle; and a call server configured to allocate a call of one of a plurality of user terminals that have requested a call to move from a departure location in the second business zone or the third business zone to a destination in the first business zone to the vehicle, transmit allocation information to the taxi terminal, receive the rate plan information from a call application, determine whether allocation of the returning vehicle is necessary for the vehicle based on the rate plan information, and in response to a determination that the allocation of the returning vehicle is necessary for the vehicle, allocate a second call from the departure location in the second business zone to the destination in the first business zone.

6. The system of claim 5, wherein:

the call server is configured to allocate the first call to the vehicle;

the plurality of applications comprise:

a call application configured to receive information indicating the destination of the first call from the call server;

a meter application configured to generate the rate plan information of the second business zone corresponding to the destination of the first call when receiving destination information of the first call;

a navigation application configured to:

set the destination of the first call as a destination of the vehicle when receiving the destination information of the first call;

generate a signal indicating that the vehicle has left the first business zone when the vehicle has left the first business zone; and generate a signal indicating arrival information when the vehicle arrives at the destination of the first call; and a controller configured to:

receive information indicating the destination of the first call from the call server;

transmit the information to the meter application and the navigation application;

receive the rate plan information, the signal indicating that the vehicle has left the first business zone, and the signal indicating the arrival information; and transmit the rate plan information, the signal indicating that the vehicle has left the first business zone, and the signal indicating the arrival information to the call application.

7. The system of claim 5, wherein the call server is configured to determine that the allocation of the returning vehicle is necessary for the vehicle when it is determined that the rate plan information of the first business zone and the rate plan information of the second business zone are different.

8. The system of claim 6, wherein the navigation application is configured to transmit a returning vehicle allocation service request signal to the controller when receiving the returning vehicle allocation service request signal for requesting returning business moving from the current location of the vehicle in the third business zone to the first business zone from a driver of the vehicle through the taxi terminal.

9. The system of claim 8, wherein the call application is configured to receive the returning vehicle allocation service request signal from the controller and to transmit the returning vehicle allocation service request signal to the call server.

10. The system of claim 9, wherein the meter application is configured to receive the returning vehicle allocation service request signal from the controller, to generate rate plan information of the third business zone, and to transmit the rate plan information of the third business zone to the controller.

11. The system of claim 10, wherein the call application is configured to receive the rate plan information of the third business zone from the controller and to transmit the rate plan information of the third business zone to the call server.

12. The system of claim 11, wherein the navigation application is configured to transmit a heading value of the vehicle, node information, and link information to the controller.

13. The system of claim 12, wherein the call application is configured to receive the heading value of the vehicle, the node information, and the link information from the controller and to transmit the heading value of the vehicle, the node information, and the link information to the call server.

14. The system of claim 13, wherein the call server is configured to:
  determine whether the vehicle is driving based on the heading value of the vehicle;
  in response to a determination that the vehicle is driving, select a first user terminal having a shortest moving distance from the current location of the vehicle from among the plurality of user terminals that have requested a call to move from the departure location in the second business zone to the destination in the first business zone based on a traveling direction of the vehicle;
  match the first user terminal to the vehicle; and
  allocate the call of the first user terminal to the vehicle.

15. The system of claim 14, wherein the call server is configured to compare heading values of the vehicle every period based on a predetermined period and to determine that the vehicle is driving when the heading value corresponding to the period changes.

16. The system of claim 15, wherein, in response to a determination that the vehicle is not driving, the call server is configured to select a second user terminal having a shortest straight distance from the current location of the vehicle among the plurality of user terminals, to match the second user terminal to the vehicle, and to allocate the call of the second user terminal to the vehicle.

* * * * *